United States Patent [19]
Johansson et al.

[11] 3,914,478
[45] Oct. 21, 1975

[54] METHOD AND COMPOSITION FOR PROTECTING RUBBER AGAINST OXIDATIVE ATTACK UTILIZING UNCURED EPM OR EPDM INTERPOLYMER

[75] Inventors: Anders H. Johansson; William C. Bond, Jr., both of Baton Rouge, La.

[73] Assignee: Copolymer Rubber & Chemical Corporation, Baton Rouge, La.

[22] Filed: Nov. 21, 1972

[21] Appl. No.: 308,549

[52] U.S. Cl............ 427/385; 427/421; 260/29.7 T; 260/29.6 T; 260/29.6 XA
[51] Int. Cl.²........................................... C08J 7/04
[58] Field of Search ............... 260/29.6 XA, 29.6 T; 117/139

[56] References Cited
UNITED STATES PATENTS

| | | | |
|---|---|---|---|
| 2,541,498 | 2/1951 | Calvert | 117/139 |
| 2,968,637 | 1/1961 | Bowers | 117/139 |
| 3,062,696 | 11/1962 | Riehl | 117/139 |
| 3,093,621 | 6/1963 | Gladding | 260/80.78 |
| 3,354,107 | 11/1967 | Hamed | 117/139 |
| 3,642,676 | 2/1972 | Saunders | 260/29.6 XA |

Primary Examiner—Melvin Goldstein
Assistant Examiner—Peter Kulkosky

[57] ABSTRACT

The protection of exposed rubber from oxidative attack by oxygen, ozone or weathering by coating the exposed rubber with an EPM or EPDM interpolymer, with or without pigments or fillers and with or without an antioxidant or antiozonant in which the coating is applied in a coating weight of 0.2 to 33 g/sq. ft. of surface area or in a film thickness of 0.1 to 20 mils.

10 Claims, No Drawings

METHOD AND COMPOSITION FOR PROTECTING RUBBER AGAINST OXIDATIVE ATTACK UTILIZING UNCURED EPM OR EPDM INTERPOLYMER

This invention relates to the protection of rubber goods for minimizing degradation and cracking by reason of weathering or ozone and oxidative attack and to compositions for use in same.

Rubber degradation can be observed by the chalking and cracking that takes place in rubber products, especially in rubber tires, belts and other rubber goods which are exposed to air, sunlight, or other outdoor weathering conditions. Such chalking and cracking is indicative of the deterioration of the rubbery component, which not only takes away from the attractiveness of the rubber product, but more importantly materially reduces the physical properties of the rubber product to the extent that the tire or other rubber goods must be replaced, since such deterioration is beyond repair.

This type of deterioration or degradation is most pronounced and rapid with cured, vulcanized or uncured highly unsaturated rubbers, such as are formulated of the conjugated dienes, as represented by natural rubber, polybutadiene rubber, isoprene rubber, styrene-butadiene rubber, butyl rubber and the like rubbers used in tire and belt manufacture. Oxidative degradation is also experienced but to a lesser extent with the cured, vulcanized or uncured EPDM rubbers and blends thereof with the conjugated butadiene rubbers of the type previously described.

Attempts have been made to protect rubbers which are subject to exposure to air, sunlight or oxidative conditions by treating the rubber with an antiozonant, antioxidant, or both, but these have been only moderately successful and require frequent application because of their limited effective life. The same applies in general to the incorporation of such antiozonants and antioxidants directly into the rubber which is subject to exposure, such as in the side walls of automobile, truck, trailer, mobile home, and tractor tires, or tires of earth moving equipment, which are subject to extended periods of outdoor exposure. Similarly, attempts have been made to protect the rubber by the application of coatings formulated to contain fillers such as carbon black and gilsonite and/or rubbers such as Buna-S and the like, but those too have been found to offer little by way of protection against oxidative attack.

It is an object of this invention to provide a composition which can be applied as a coating onto cured, vulcanized, or other rubber goods to minimize the deterioration or degradation of the rubber goods by reason of weathering or oxidative attack and it is a related object to provide a means which can be made readily available for application in a simple and inexpensive manner, which can be used for protection of rubber without the need for highly skilled labor or special equipment, which is effective over long periods of time to protect the rubber surfaces against degradation or oxidative attack, and which can be marketed in pcakages for sale, distribution and use separate and apart from the rubber product, and which can be provided in clear or compositions embodying a desired color.

In accordance with the practice of this invention, protection against weathering or ozone or oxidative attack or degradation of rubber goods, especially cured or vulcanized elastomeric products, can be achieved by treatment to coat the exposed surfaces of the rubber goods with a thin coating of an EPM or EPDM interpolymer in an uncured stage. Application to coat the rubber goods can be made by brush coating, spray coating, dip coating, or from an aerosol container, in the form of an aqueous dispersion or latex, but preferably in the form of a solvent solution of the EPM or EPDM interpolymer.

When measured from the standpoint of film thickness, the desired protection can be achieved with a coating of EPDM or EPM having a film thickness within the range of 0.1 to 20 mils and preferably within the range of 0.5 to 5 mils. Coatings having a thickness greater than 20 mils are effective but not so much more effective as to justify the additional cost from the standpoint of material and labor for the application of films of greater thickness. When measured from the standpoint of dry coating weight of the EPDM or EPM interpolymer, protection is achieved with coating weights within the range of 0.2 to 33 g/sq.ft. of surface area, and preferably within the range of 0.8 to 8.5 g/sq.ft. of surface area covered.

The protective coating can be applied to provide the desired coating weight in a single application or in multiple coats to build up the desired thickness from solution, emulsion, dispersion or aerosol containing the EPM or EPDM in an amount ranging from 1% solids to as much as 30% solids and preferably from solution containing from 2–15% by weight of the interpolymer. As the liquid solvent component, use can be made of a solvent in which the monomers are dissolved for solution interpolymerization, but it is preferred to make use of a solvent selected of toluene, cyclohexane, Varsol, chlorinated hydrocarbons, kerosene, aromatic distillates, such as Solvesso 100, and the like organic solvent in which the EPM or EPDM is soluble.

In addition to the interpolymer, the coating composition can be formulated with pigments such as carbon black, gilsonite, colloidal silica, colored pigments and dyestuffs and the like for color coating, or with white pigment such as zinc oxide, titanium dioxide and the like for coating of white side walls in tires to provide ozone and weather resistance.

Compatible waxes, such as paraffin wax, carbowax and the like can be added to the composition to give the dry coating an attractive, shiny appearance without interfering with the adhesion of the coating to the protected rubber surface and without interfering with the protection provided to the rubber goods by the coating. Such additives can be added in amounts within the range of 1–30% by weight of the interpolymer.

Antioxidants and antiozonants can be added to the coating composition, not for the purpose of providing protection against oxidation but to prevent gellation of the interpolymer during storage. For this purpose, antioxidants can be incorporated in the coating composition in amounts within the range of 0.05% to 2% by weight and preferably 0.1% to 1% by weight of the interpolymer. Representative of suitable antioxidants and antiozonants which can be used are phosphatized polyalkyl polyphenols of the non-staining type or alkylated diphenyl amines of the staining type, such as marketed under the trade name Geltrol, Flexone 51, Wingstay 200 and Azerite.

The applied coating compositions are generally allowed to air dry but drying may be accelerated by heating to elevated temperature such as with an infrared ray lamp.

The term EPM refers to a class of copolymers formed by the interpolymerization of ethylene and one or more α-monoolefins having from 3 to 16 carbon atoms, preferably propylene. The ethylene to propylene or other monoolefin are present in the interpolymer in the mole ratio of 10–90 moles ethylene to 90–10 moles propylene or other monoolefin, with the interpolymerization being carried out in solvent solution in the presence of a Ziegler catalyst, as will hereinafter be described.

The EPDM interpolymers useful in the present invention are well known to the art and are generally prepared by the reaction of ethylene, at least one other straight chain α-monoolefin having from 3 to 16 carbon atoms, such as propylene, isobutylene and the like, and an aliphatic or cycloaliphatic polyene having from 4 to 20 carbon atoms.

In the preferred EPDM interpolymers, the ethylene to monoolefin ratio is within the range of 10–90 mole percent ethylene to 90–10 mole percent monoolefin while the polyene is present in an amount within the range of 0.1 to 10 mole percent and preferably in the form of an unsaturated bridged ring hydrocarbon having at least one carbon to carbon double bond in the bridged ring with the interpolymerization being carried out in solution in hexane or other organic solvent and in the presence of a catalyst prepared of vanadium oxytrichloride and methyl or ethyl aluminum sesquichloride or other suitable Ziegler type catalyst. For a more detailed description of the preparation of such EPDM interpolymers, reference may be made to U.S. Pat. Nos. 2,933,480; 3,093,620; 3,093,621; 3,211,709; 3,113,115 and 3,300,450, the teachings of which are incorporated herein by reference.

Examples of bridged ring hydrocarbons include the polyunsaturated derivatives of bicyclo-(2,2,1)-heptane wherein at least one double bond is present in one of the bridged rings, such as dicyclopentadiene (DCP), bicyclo(2,2,1)-hepta-2,5-diene, 1,4-hexadiene and alkylidene norbornenes and especially the 5-ethylidene-2-norbornenes wherein the alkylidene group contains from 1 to 20 carbon atoms and preferably 1 to 8 carbon atoms, and alkenyl norbornenes, especially the 5-alkylene-2-norbornenes, wherein the alkenyl group contains from 3 to 20 carbon atoms and preferably 3 to 10 carbon atoms. Specific examples of bridged ring norbornenes include 5-methylene-2-norbornene, 5-ethylidene-2-norbornene, 5-isopropylidene-2-norbornene, dicyclopentadiene, methyl butenyl norbornene such as 5-(2-methyl-2-butenyl)-2-norbornene or 5-(3-methyl-2-butenyl)-2-norbornene.

The polymerization solvent may be any suitable inert or saturated hydrocarbon which is liquid and relatively nonviscous under the reaction conditions, including the prior art solvents for the solution polymerization of monoolefins in the presence of a Ziegler catalyst. Examples of satisfactory hydrocarbon solvents include open chain saturated hydrocarbons containing 5 to 8 carbon atoms, of which hexane is usually preferred; aromatic hydrocarbons and especially those containing a single benzene nucleus such as benzene or toluene; and saturated cyclic hydrocarbons which have boiling ranges approximating those for the open chain and aromatic hydrocarbons discussed above, and especially saturated cyclic hydrocarbons containing 5 or 6 carbon atoms in the ring. The solvent may be a mixture of one or more of the foregoing hydrocarbons, such as a mixture of aliphatic and naphthenic hydrocarbon isomers having approximately the same boiling range as normal hexane. It is necessary that the solvent be dry and free of substances which will interfere with the Ziegler catalyst.

In general, any suitable prior art Ziegler-type catalyst may be used which is known to produce a satisfactory elastomer. Ziegler catalysts are disclosed in a large number of issued patents, such as U.S. Pat. Nos. 2,933,480; 3,093,620; 3,093,621; 3,211,709 and 3,113,115. Examples of Ziegler catalysts include metal organic coordination catalysts prepared by contacting a compound of a metal of Groups IVa, Va, VIa and VIIa of the Mendelejeff periodic chart of the elements, as typified by titanium, vanadium and chromium halides, with an organometallic compound of a metal of Groups I, II or III of the Mendelejeff periodic chart which contains at least one carbon-metal bond, as typefied by trialkyl aluminum and alkyl aluminum halides wherein the alkyl groups contain 1 to 20 and preferably 1 to 4 carbon atoms.

The preferred Ziegler catalyst for many polymerizations is prepared from a vanadium compound and an alkyl aluminum halide. Examples of suitable vanadium compounds include vanadium trichloride, vanadium tetrachloride, vanadium oxytrichloride, vanadium acetylacetonate, etc. Activators which are especially preferred include alkyl aluminum chlorides of the general formulae $R_1AlCl_2$ and $R_2AlCl$, and the corresponding sesquichlorides of the general formula $R_3Al_2Cl_3$, wherein R is a methyl, ethyl, propyl, butyl or isobutyl radical. A catalyst prepared from methyl or ethyl aluminum sesquichloride and vanadium oxytrichloride is especially preferred, and when using this catalyst, the optimum ratio of the catalyst components is usually 1 mole of vanadium oxytrichloride for each 8 to 20 moles of the alkyl aluminum sesquichloride.

The following examples, for the manufacture of EPM and EPDM interpolymers, are given by way of illustration but not by way of limitation:

EXAMPLE 1

This example is addressed to the manufacture of an EPM copolymer of ethylene and propylene in the mole ratio of approximately 60 ethylene to 40 propylene.

The reaction vessel was a one-gallon Sutherland reactor equipped with a high speed, heavy-duty, air driven motor; cooling coils; a thermometer; a temperature regulator; a pressure regulator; an injection port; and other openings where monomers, catalyst, and solvent were fed to the reactor. A tube dipping to the bottom of the reactor was present for the continuous removal of the cement produced. A vapor phase vent was provided to bleed off 10% of the gaseous monomer feed to prevent inert gas buildup.

The clean reactor was assembled, rinsed with dry hexane and purged overnight with dry nitrogen. Hot water was run through the coils until the temperature in the reactor was about 70°C. After this, propylene was flushed through the reactor for about 15 minutes; then the temperature was lowered to ambient and two liters of Esso chemical grade hexane, dried over 4A molecular sieves and stored over sodium, was added to the reactor. As the temperature reached 45°C, propylene was fed to the reactor through a 4A molecular sieve column until 5 ft. 10 5/16 in. Hg pressure was reached. The pressure was then brought up to 30 psig with ethylene fed through a 4A molecular sieve column and 60 μ liters of pyridine along with 2.6 cc of 1.5 M ethylaluminum sesquichloride were added.

The monomers were shut off and the catalysts, 0.20 molar ethylaluminum sesquichloride and 0.006 molar vanadium oxytrichloride at a 40 to 1 aluminum to vanadium ratio, and 0.042 molar butyl perchlorocrotonate (BPCC) at a 7.0 to 1 BPCC to vanadium ratio, were fed into the reactor at a constant rate until a drop in pressure in the reactor was noted. At this time, the gaseous monomers were fed into the reactor through suitably calibrated rotometers at a rate of 3,251 cc per minute, of which 1,703 cc were ethylene and 1,548 cc were propylene. The polymerization was controlled by the catalyst pumps which added catalyst on demand as the pressure increased, thus maintaining the 30 psig pressure throughout the run. When the solution became approximately 8% polymer, solvent containing 16 cc/cc ethylene was fed at the rate of 52.8 cc per minute into the reactor and the polymer cement taken off which produced about 220 g of polymer per hour.

At this time the ethylene and propylene feeds were adjusted to 891 cc/minute and 2,936 cc/minute to compensate for the unreacted monomers removed with the cement. An additional 897 cc ethylene were being added at the same time with the makeup solvent.

The solution cement as removed from the reactor was fed into a Waring Blendor containing water where it was intimately mixed. The cement was then washed two times with equal volumes of water. The washed and stabilized cement (0.1 phr on the rubber of the experimental Irganox 1,010) was fed with nitrogen pressure into a tee joint at the bottom of a 4-liter container full of hot circulating water. The other end of the tee is connected to a steam line and steam was admitted at such a rate as to superheat the rubber cement. The solvent and unreacted monomers were mostly removed by this procedure. The rubber crumb was collected on a screen, washed and chopped up in a Waring Blendor. The rubber crumb was dried in the oven at 90°C to remove any remaining solvent and water giving a rubbery copolymer which contained 57 mole percent ethylene by infrared analysis, using the 720 $cm^{-1}$ absorbance for ethylene and the 968 $cm^{-1}$ absorbance for propylene, and had a reduced specific viscosity in Decalin at 135°C of 2.1.

EXAMPLE 2

The following example represents the manufacture of an EPDM rubber having bound ethylene to propylene in the ratio of 83:17 and with an actual unsaturation level of about 5 carbon-to-carbon double bonds per 1,000 carbon atoms.

The reaction vessel was a one-gallon Sutherland reactor otherwise equipped the same as in Example 1.

The clean reactor was assembled, rinsed with dry hexane and purged overnight with dry nitrogen. The reactor bowl was heated with a flameless blowtorch and hot water was run through the coils until the temperature in the reactor was about 70°C. After this, propylene was flushed through the reactor for about 15 minutes; then the temperature was lowered to ambient and two liters of Esso chemical grade hexane, dried over 4A molecular sieves and stored over sodium, was added to the reactor. As the temperature was brought to 41°C, propylene was fed to the reactor through a 4A molecular sieve column until 19.7 inches Hg pressure was reached. The pressure was then brought up to 30 p.s.i. with ethylene fed through a 4A molecular sieve column and approximately 0.12 ml. pyridine inhibitor and 2.6 cc of 1.5 M ethylaluminum sesquichloride were added.

The monomers were shut off and the catalysts, 0.165 molar ethylaluminum sesquichloride and 0.005 molar vanadium oxytrichloride at a 40 to 1 aluminum to vanadium ratio, were fed into the reactor at a constant rate until a drop in pressure in the reactor was noted. Also added 0.35 M butyl perchlorocrotonate at 7 to 1 ratio on vanadium. At this time the gaseous monomers were fed into the reactor through suitable calibrated rotometers at a rate of 2,864 cc/minute, of which 2,224 cc were ethylene and 640 cc were propylene; the termonomer 5-alkylidene-2-norbornene was added as a 0.33 M solution in hexane at 3.28 cc/minute which provided about 4.3 weight percent to be incorporated into the polymer. The polymerization was controlled by the catalyst pumps which added catalyst on demand as the pressure increased, thus maintaining the 30 p.s.i. pressure throughout the run. When the solution became approximately 7% polymer, solvent containing 16 cc/cc ethylene was fed at the rate of 51.2 cc/minute into the reactor and the polymer cement taken off which produced about 180 g. of polymer per hour.

At the time the ethylene and propylene feeds were adjusted to 1,601 cc/minute and 1,534 cc/minute to compensate for the unreacted monomers removed with the cement.

The solution cement as removed from the reactor was fed into a Waring Blendor containing water where it was intimately mixed. The cement was then washed three times with equal volumes of water. The washed and stabilized cement (1 phr on the rubber of the experimental stabilizer Irganox 1,010) (Geigy) was fed with nitrogen pressure into a tee joint at the bottom of a 4-liter container full of hot circulating water. The other end of the tee is connected to a steam line and stem was admitted at such a rate as to superheat the rubber cement. The solvent and unreacted monomers were mostly removed by this procedure. The rubber crumb was collected on a screen, washed and chopped up in a Waring Blendor. The rubber crumb was dried in the oven at 90°C to remove any remaining solvent and water giving a rubbery copolymer which contained 84 mole percent ethylene analysis, and had a reduced specific viscosity in Decalin at 135°C of 2.75. The unsaturation expressed in C=C/1,000 carbon atoms was 4.8.

The improved protection that is obtainable by the practice of this invention will be illustrated with reference to EPM 460, EPsyn 3,506 and/or EPsyn 5,509, marketed by Copolymer Rubber & Chemical Corporation of Baton Rouge, Louisiana, by comparison with uncoated rubber and rubber coated with materials which have previously been used for protection, such as SBR rubber, antioxidants and antiozonants, such as Flexone 5L, Windstay 200 and commercial tire coatings such as Tire Black by Hi Power and Tire Black marketed by DuPont and formulated to contain 7% carbon black, 23% gilsonite and 70% aliphatic hydrocarbons.

EPM 460 is an ethylene-propylene copolymer corresponding to that which is produced in Example 1. EPsyn 5,509 is an EPDM interpolymer of ethylene, propylene and 5-ethylidene-2-norbornene, in which the ethylene and propylene are present in the molecular ratio of about 83:17 and in which the polyene-5-ethylidene-2-norbornene is present in an amount to provide about 5 carbon-to-carbon double bonds per 1,000 carbon atoms and is represented by the interpolymer produced by Example 2.

EPsyn 3506 is an EPDM interpolymer produced in a manner similar to that described in Example 2 but in which the molecular ratio of ethylene to propylene is about 60 moles ethylene to 40 moles propylene and in which the polyene is dicyclopentadiene instead of 5-ethylidene-2-norbornene.

Outdoor aging and static bent-loop ozone tests were conducted as described in ASTM D-518-61 (1968). The rubber test pieces (1 5/16 × 3 ¾) were each dipped for 15 seconds in the test solution, mounted in the appropriate apparatus and placed in an ozone chamber containing 100 pphm ozone and the test pieces were periodically examined for cracking as indicated in the following tabulation. The specimens were rated in accordance with the number and severity of cracks with 0 representing the best and 10 representing the worst.

The test pieces representing white side wall stock were prepared from the following formulation:

| Ingredients | Parts |
| --- | --- |
| COPO 1502 | 30 |
| Pale Crepe | 50 |
| EPsyn 3506 | 20 |
| Circolite Oil | 5 |
| AO 2246 | 1 |
| Zinc Oxide | 20 |
| Hard Clay | 20 |
| $TiO_2$ | 40 |
| Stearic Acid | 2 |
| Ultramarine B | 0.2 |
| NOBS Special | 0.8 |
| DOTG | 0.5 |
| Crystex Sulfur | 3 |

The test pieces representing black SBR tread stock were cut from slabs prepared from the following formulation:

| Ingredients | Parts |
| --- | --- |
| COPO 1712 | 103 |
| Phillips Cis-4 | 25 |
| ISAF Black | 65 |
| Zinc Oxide | 3 |
| Stearic Acid | 2 |
| Agerite Resin D | 1.5 |
| Agerite HP | 0.5 |
| Autozite 67F | 3 |
| Phil Rich 5 Oil | 7 |
| Santocure | 1.5 |
| Sulfur | 1.8 |
| Cured 15 minutes at 320°F. | |

Evaluations were made in the outdoor aging tests to determine the number of days before visual cracks appeared in the test specimens, with the first observation made after 25 days exposure, and the rating for the amount of cracking was made at the end of 86 days of exposure for the black SBR tire stock. The following table gives the concentration of active ingredient in the coating composition as well as the solvent employed:

TABLE I

| Test Material | Concentration | Solvent | Days until cracking appeared | Rating at end of 86th day |
| --- | --- | --- | --- | --- |
| | | dipped in | | |
| Untreated rubber | | Toluene | 25 | 8 |
| EPM 460 | 2.0 | Toluene | 86 | 0 |
| SBR | 2.0 | Toluene | 31 | 7 |
| EPsyn 5509 | 2.0 | Cyclohexane | 73 | 1 |
| Wingstay 200 | 4.0 | Toluene | 25 | 8 |
| Flexone 5L | 4.0 | Toluene | 25 | 6 |
| EPsyn 3506 | 2.0 | Toluene | 77 | 0.5 |
| Tire Black DuPont | | | 32 | 3 |
| Tire Black Hi Power | | | 25 | 8 |

It will be observed that with untreated rubber and with rubber treated with antioxidant or Hi Power Tire Black, cracking was visible when the first observation was made at the end of 25 days and ratings as high as 6 to 8 were recorded after the 86 days of exposure. In each instance, the days until cracking appeared were markedly increased by coating the base rubber with EPM or EPDM, with the ratings reduced to as low as 0 to 1 in the 86 days exposure test. Coating with SBR increased the time before cracking appeared to 31 days but the cracking rating of 7 was still too high.

The following table gives the results obtained in the Orec, Cyclic or Dynamic Ozone test on white tire stock with an Orec Model 016 Dynastretch unit, in accordance with the test procedure published by Ozone Research & Equipment Corporation of Phoenix, Arizona:

TABLE II

| Active Ingredient | Concentration | Solvent | Rating |
| --- | --- | --- | --- |
| Uncoated SBR | | No dip | 4 |
| Uncoated SBR | | Toluene dip | 4 |
| Uncoated SBR | | Trichloroethylene | 4 |
| EPsyn 460 | 2.0 | Toluene | 4 |
| SBR 1712 | 2.0 | Toluene | 6 |
| EPsyn 5609 | 2.0 | Cyclohexane | 0.6 |
| EPsyn 5509 | 2.0 | Trichloroethylene | 0.5 |
| EPsyn 3506 | 2.0 | Toluene | 0.0 |
| EPsyn 3506 | 2.0 | Trichloroethylene | 0.0 |
| EPsyn 5509 | 0.8 } | Cyclohexane | 0.5 |
| EPsyn 3506 | 1.2 } | | |
| Wingstay 200 | 4.0 | Toluene | 4.0 |
| Flexone 5L | 4.0 | Toluene | 6.0 |
| DuPont Tire Black | | | 8.0 |
| Hi Power Tire Black | | | 6.0 |

From the foregoing it will again be observed that EPDM coatings gave values as low as 0 to 0.5 whereas the ratings for SBR and others of the commercial coatings indicate that little if any protection is obtained.

The following Table III gives the results obtained in the Cyclic Ozone Test in a chamber containing 100 pphm ozone, for various rubber coatings on white side wall and black SBR tread stock:

TABLE III

| Coating Solution Composition | Rating* White Sidewall Stock | Rating** SBR Tread Stock |
| --- | --- | --- |
| References (not dipped) | 2 | 9 |
| 2% EPsyn 5509 in toluene | 0 | 2 |

TABLE III -Continued

| Coating Solution Composition | Rating* White Sidewall Stock | Rating** SBR Tread Stock |
| --- | --- | --- |
| 2% EPsyn 5509 in trichloroethylene | 0 | 1 |
| 2% Bromobutyl rubber in toluene | 0.5 | 9 |
| 2% Bromobutyl rubber in trichloroethylene | 3 | 9 |
| 2% Chlorobutyl rubber in toluene | 7 | 9 |
| 2% Chlorobutyl rubber in trichloroethylene | 5 | 9 |
| 2% Neoprene W in toluene | 8 | 9 |
| 2% Neoprene W in trichloroethylene | 7 | 9 |
| 2% EPsyn 5509 in trichloroethylene (dipped twice) | — | 1 |

*48 hrs.
**24 hrs.

It will be observed from the values obtained, as set forth in Table III, that the protection against oxidative degradation which is obtained with EPDM (EPsyn 5,509) differs in kind rather than degree from the amount of protection made available from coatings with other rubbers such as bromobutyl rubber, chlorobutyl rubber and neoprene.

It will be understood that changes may be made in the details of formulation and application without departing from the spirit of the invention, especially as defined in the following claims.

We claim:

1. The method for protecting exposed rubber of rubber goods from attack by oxygen, ozone or weathering comprising coating the exposed surface of the rubber goods with a composition, the essential ingredient of which consists of an uncured interpolymer of ethylene and at least one alpha-monoolefin having from 3 to 16 carbon atoms (EPM), or ethylene, at least one alpha-monoolefin having from 3 to 16 carbon atoms and a polyene having from 4 to 20 carbon atoms (EPDM) and allowing the coating to dry.

2. The method as claimed in claim 1 in which the coating is applied in a film thickness within the range of 0.1 to 20 mils.

3. The method as claimed in claim 1 in which the coating is applied in a film thickness within the range of 0.5 to 5 mils.

4. The method as claimed in claim 1 in which the interpolymer is applied in a dry coating weight of 0.2 to 33 grams per square foot of surface area.

5. The method as claimed in claim 1 in which the interpolymer is applied in a dry coating weight of 0.8 to 8.5 grams per square foot of surface area.

6. The method as claimed in claim 1 in which the coating includes a filler or pigment in addition to the interpolymer in an amount within the range of 1–30% by weight of the total composition.

7. The method as claimed in claim 1 in which the coating contains an antioxidant and/or an antiozonant in addition to the interpolymer in an amount within the range of 0.05% to 2.0% by weight of the interpolymer.

8. The method as claimed in claim 1 in which the coating is applied from a solution of the interpolymer in an organic solvent.

9. The method as claimed in claim 1 in which the coating is applied from a dispersion of the interpolymer in aqueous medium.

10. The method as claimed in claim 1 in which the coating is applied from aerosol spray.

* * * * *